United States Patent [19]
Sawyer et al.

[11] Patent Number: 6,073,006
[45] Date of Patent: Jun. 6, 2000

[54] METHOD AND APPARATUS FOR DETECTING AND PREVENTING FRAUD IN A SATELLITE COMMUNICATION SYSTEM

[75] Inventors: Steven Paul Sawyer, Fountain Hills; Wenko Lin, Phoenix, both of Ariz.

[73] Assignee: Motorola, Inc., Schaumburg, Ill.

[21] Appl. No.: 08/851,294

[22] Filed: May 5, 1997

[51] Int. Cl.⁷ .................................................. H04Q 7/185
[52] U.S. Cl. .......................... 455/410; 455/427; 455/428
[58] Field of Search .................................... 455/410, 411, 455/427, 428, 430, 67.1, 445

[56] References Cited

U.S. PATENT DOCUMENTS

| | | | |
|---|---|---|---|
| 5,335,278 | 8/1994 | Matchett et al. | 455/410 |
| 5,748,742 | 5/1998 | Tisdale et al. | 455/410 |
| 5,757,916 | 5/1998 | MacDoran et al. | 342/357 |
| 5,799,249 | 8/1998 | Kennedy, III et al. | 455/411 |
| 5,815,807 | 9/1998 | Osmani et al. | 455/410 |

FOREIGN PATENT DOCUMENTS

| | | | |
|---|---|---|---|
| 0163358 | 12/1985 | European Pat. Off. | H04Q 7/04 |
| 0536921 | 4/1993 | European Pat. Off. | H04B 7/195 |
| 9309640 | 5/1993 | WIPO | H04Q 7/04 |
| 9501707 | 1/1995 | WIPO | H04Q 7/30 |

*Primary Examiner*—Edward F. Urban
*Assistant Examiner*—Tilahun Gesesse
*Attorney, Agent, or Firm*—Walter W. Nielsen; Dana B. LeMoine; James E. Klekotka

[57] ABSTRACT

Switchable nodes (300), such as satellites (20,21) and/or gateways (40,41), along with a modified call setup procedure are used in satellite communication system (100) to prevent fraudulent users from misusing resources by not allowing those resources to be available until the call setup procedure is completed. Also, both satellites and gateways monitor traffic to determine when unauthorized traffic is occurring. Switchable nodes (300) can intercept calls for both monitoring and control purposes and deny access to fraudulent and suspicious users and communication units.

14 Claims, 4 Drawing Sheets

400

METHOD AND APPARATUS FOR DETECTING AND PREVENTING FRAUD IN A SATELLITE COMMUNICATION SYSTEM

FIELD OF THE INVENTION

This invention relates generally to communication systems and, more particularly, to apparatus and methods for detecting and preventing fraudulent users from acquiring unauthorized communication services from a satellite communication system.

BACKGROUND OF THE INVENTION

Existing and proposed large multi-satellite constellation systems are expensive to build and place into orbit. Because of the expense, it is desirable to fully capture payment for communication services provided to authorized users and minimize the amount of services provided to unauthorized users. Both authorized and unauthorized users can utilize the capacity of these constellations. The satellite communication system must restrict the amount of services being provided to unauthorized users so that constellation capacity is fully utilized by authorized users.

A "satellite" is defined herein to mean a man-made object or vehicle intended to orbit Earth and includes both geostationary and orbiting satellites and/or combinations thereof. A "constellation" is defined herein to mean an ensemble of satellites arranged in orbits for providing specified coverage of a portion or all portions of the celestial body. A constellation typically includes multiple rings (or planes) of satellites and can have equal numbers of satellites in each plane, although this is not essential.

Communication units in a mobile communication system occasionally perform call setup procedures which require system resources from the system to which they currently subscribe. Call setup procedures are required to enable the system to contact the called communication unit when a call attempt is destined for that communication unit, and system resources must be allocated for the call. Call setup information forms the basis for many billing purposes.

Each call set-up procedure involves an exchange of messages between the initiating communication unit and the system and between the system and a termination communication unit. These call set-up messages generate communication traffic which is non-revenue bearing in nature. These call set-up processes can be compromised by fraudulent users to gain access to communication services which are also non-revenue bearing. The non-revenue bearing traffic volume is compounded when any communication unit or groups of communication units engage in fraudulent use of system resources and services.

In prior art systems, mission traffic paths were completed before the signaling process was completed. This allowed fraudulent users to use system resources until the signaling process ended. This did not occur until the last timer expired. Prior art call set up procedures required each communication unit to react as it was designed to react within the system. This requirement can be costly to the system and can result in a large amount of non-revenue bearing traffic.

What are needed are a method and apparatus for detecting the fraudulent use of system resources during the call set-up process. Further, a method and apparatus are needed to prevent the fraudulent use of system resources during the call set-up process.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

Figure 1:
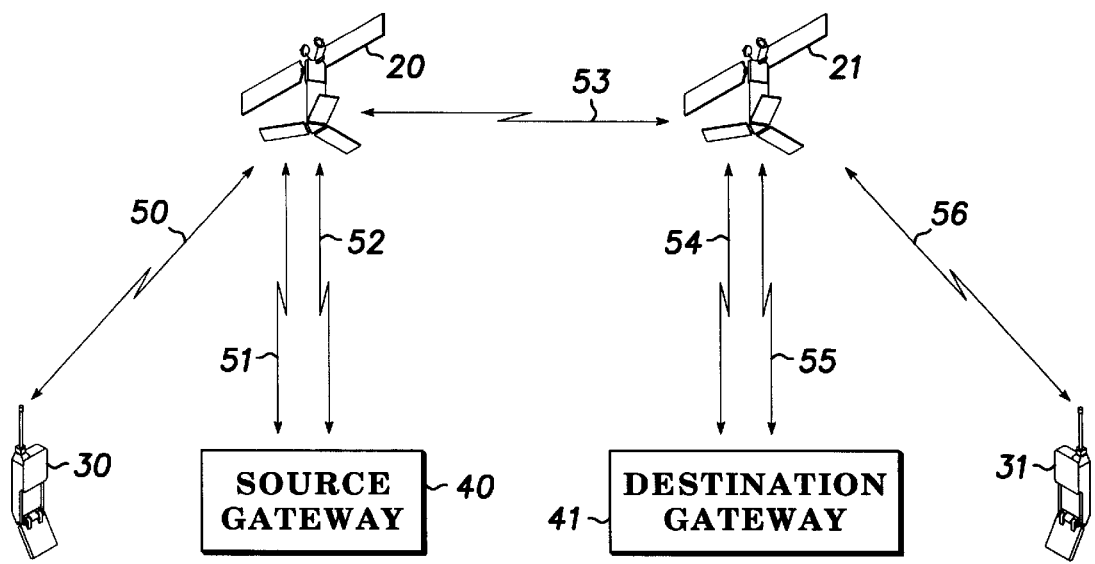
FIG. 1 shows a simplified block diagram of a satellite communication system in which fraudulent detection and prevention facilities are provided in accordance with a preferred embodiment of the present invention.

The present invention provides a method and apparatus for detecting the fraudulent use of system resources during the call set-up process. Further, the present invention provides a method and apparatus to prevent the fraudulent use of system resources during the call set-up process.

Throughout this description, a "calling party" is the party originating the call. The "called party" is the party receiving or designated to receive the call. The conventional call set-up process is a modified version of the GSM Call Setup procedure. When the calling party initiates the call setup process by keying in a number and pushing the send key, a number of timers inherent in the system design leave the system vulnerable to misuse by fraudulent users.

For example, consider the following call establishment process between an originating communication unit (OCU) and a terminating communication unit (TCU). An OCU-to-TCU call is used as an example to describe a prior art process of placing a call. The OCU is the calling party and the TCU is the called party.

In this example, OCU calls TCU. Both units are initially in the Standby Mode. This means that they have both reported their current location to the prior art system and are ready to send or receive a call. Both units could be located anywhere on the earth's surface. If a CU is roaming out of its home gateway coverage area, CU's home gateway and serving gateway are two distinct gateways.

To initiate the call, OCU enters TCU's phone number via the OCU's keypad and presses "send" to access the network. OCU then automatically uploads its assigned identification as well as the number being called. The serving satellite sends the information received from OCU to its home gateway. The home gateway determines OCU's location and can assign the control of the call to a serving gateway. This gateway is the controlling gateway for the call. OCU's serving gateway determines that the called party is a particular TCU, and it queries TCU's home location register and visitor location register to locate TCU. In this example, OCU's serving gateway contacts the TCU's home gateway, it determines that TCU's registration is valid and that its last known location is in a visiting gateway. TCU's last known location is relayed via the prior art system's network of switches to the OCU's serving gateway, which then routes the call to TCU's serving gateway.

A setup signal is then sent to TCU. When the TCU responds, an acknowledgment signal is sent through the prior art system's network of switches. At this point, each serving gateway redirects the mission traffic through the satellite constellation only. That is, the gateways are not included in the mission traffic path. The mission traffic path (channel) is totally engaged and the conversation (data exchange) can occur. However, the normal (unmodified) communication units do not allow conversation to take place at this time. The normal setup process must proceed further before conversation can take place. The TCU sends the CC alerting message to the terminating switch. This notifies the switch that the TCU has begun "ringing" the TCU. When the TCU user answers the ringing phone, the TCU sends the CC Connect message to the terminating switch to notify the switch that the call has been answered. When the CC connect message is processed, the prior art system allows two way conversations and begins the billing process. When the call is released, the caller, destination, and start and stop times of the call are recorded by the controlling gateways, and relayed to a central billing center.

If the OCU and TCU are modified, then they can take advantage of the mission traffic path through the satellites when the mission traffic path is established by the system. The TCU never has to send a connect message. System resources are available for use until the system timers expire.

One method for fraudulent users to exploit the timers used in the system involves delaying the sending of the connect message until the last moment. If the fraudulent user is able to use system resources up to the point at which the connect message is sent, then all of this time and unauthorized use are not billed and system resources are dishonestly being used. This type of fraud can be difficult to detect. Another method for fraudulent users involves never sending a connect message. Fraudulent users could use system resources for free until the system timers expired. By not sending a connect message, these users never start the billing process and the system has no record that the terminating communication unit accepted a call. Two fraudulent users could continue calling back and use system resources again and again.

This conventional call set-up process inefficiently manages system resources. During call set-up, there is a significant amount of time in which system resources are not monitored and can be used by fraudulent users. Fraudulent usage can impact routing decisions because routing algorithm are based on known loading conditions. The present invention has utility in that it reduces the amount of time that system resources are not monitored or protected for the duration of the set-up process for calls.

FIG. 1 shows a simplified block diagram of a satellite communication system in which fraudulent detection and prevention facilities are provided in accordance with a preferred embodiment of the present invention. Satellite communication system 100 comprises at least one satellite 20, any number of communication units 30 and at least one gateway 40. Generally, satellites 20, 21, communication units 30, 31 and gateways 40, 41 of satellite communication system 100 can be viewed as nodes in a network of nodes. All nodes of satellite communication system 100 may or may not be in data communication with other nodes of satellite communication system 100 through communication links. In addition, all nodes of satellite communication system 100 may or may not be in data communication with other communication devices dispersed throughout the world through public switched telephone networks (PSTNs) and/or conventional terrestrial communication devices coupled to a PSTN through conventional terrestrial base stations.

The present invention is applicable to satellite communication systems 100 that assign particular regions on the earth to specific cells on the earth, and preferably to satellite communication systems 100 that move cells across the surface of the earth. Although the present invention is applicable to satellite communication systems 100 having at least one satellite 20 in low-earth, medium-earth or geosynchronous orbit, satellite 20 is preferably in low-earth orbit around earth. Satellite 20 can be a single satellite or one of many satellites 20, 21 in a constellation of satellites orbiting the earth. The present invention is also applicable to satellite communication systems having satellites which orbit the earth at any angle of inclination including polar, equatorial, inclined or other orbital patterns. The present invention is applicable to systems where full coverage of the earth is not achieved and to systems where multiple coverage of portions of the earth occurs.

Each satellite 20 communicates with other nearby satellites 21 through cross-links. Each crosslink is used for mission traffic and signaling traffic. Crosslinks form the backbone of satellite communication system 10. Thus, a call or communication from communication unit 30 located at any point on or near the surface of the earth can be routed through satellite 20 or a constellation of satellites 20, 21 to within range of substantially any other point on the surface of the earth. A communication can be routed down to communication unit 31 (the called party) on or near the surface of the earth from satellite 21. The methods used by satellite 20 to physically communicate with communication unit 30 and gateway 40 are well known to those of ordinary skill in the art.

Communication units 30, 31 can be located anywhere on the surface of earth or in the atmosphere above earth. Satellite communication system 100 can accommodate any number of communication units 30, 31. Communication units 30, 31 are preferably communication devices that are capable of receiving voice and/or data from satellites 20, 21. By way of example, communication units 30, 31 can be hand-held, mobile satellite cellular telephones adapted to transmit to and receive transmissions from satellites 20, 21. Moreover, communication units 30 can be computers capable of sending e-mail messages, video signals, facsimile signals, and so on. The methods used by communication units 30, 31 to physically transmit voice and/or data to and receive voice and/or data from satellites 20, 21 are well known to those of ordinary skill in the art.

Gateways 40, 41 communicate with and may control satellites 20, 21. There can be multiple gateways 40, 41 located at different regions on the earth. Gateways 40, 41 can provide satellite signaling commands to satellites 20, 21 so that satellites 20, 21 maintain their proper position in their orbit and perform other essential house-keeping tasks. Gateways 40, 41 can be additionally responsible for receiving voice and/or data from satellites 20, 21. The methods used by gateways 40, 41 to physically communicate with satellites 20, 21 are well known to those of ordinary skill in the art. Gateways can comprise earth communication subsystems. Gateways can also include terrestrial-based switches.

Whenever a communication unit located at a first gateway wants to communicate with another communication unit located at a second gateway, a conventional call set-up process is executed. The call set-up process is executed to establish signaling traffic and mission traffic connections so that the two communication units can communicate with each other. A signaling traffic connection is used for passing control or signaling information between two nodes, for example, a communication unit and a gateway. A mission traffic connection is used for passing voice and/or data between two communication units, for example. Both the signaling and mission traffic connections are necessary for handling a call between two communication units in the satellite communications system.

The problem with the prior art system is that it relies upon users to be honest and not try to modify their communication units to fraudulently gain access to system resources and system services. The prior art system is concerned with establishing a connection between two users as soon as possible to keep the customers happy and thus retain them as customers.

The problem also occurs because there is a so-called transparent signaling layer which must proceed before voice communication between users can take place. A signaling path is established, and signaling messages are exchanged without the knowledge of a normal user. The consumption of system resources for signaling purposes must be kept to a minimum since this is non-revenue bearing traffic.

The prior art system establishes a mission traffic path through the network before the signaling task is completed. Normal users with unmodified communication equipment cannot use this mission traffic path. The method and apparatus of the present invention both detect and prevent fraudulent users who try to use the mission traffic path before they are authorized to use it.

In a preferred embodiment, a first segment (50,51) is established from originating CU 30 to source gateway 40. When originating CU 30 wants to communicate with terminating CU 31, originating CU 30 first establishes a local signaling connection (not shown) to source gateway 40. The signaling connection carries the signaling traffic. Next, originating CU 30 establishes a local mission traffic connection to source gateway 40. The local mission traffic connection can pass through satellite 20 and can include local mission traffic segments 50 and 51 as shown in FIG. 1. The local mission traffic connection carries the mission traffic. Satellite 20 is a switchable node in satellite communication system 100. Satellite 20 is used to connect segment 50 with segment 51 to establish a local mission traffic connection. Satellite 20 also provides a local signaling connection (not shown).

Once the first segment or local connection is created between originating CU 30 and source gateway 40, source gateway 40 next needs to establish a location for terminating CU 31. If source gateway 40 determines that terminating CU 31 is located in another gateway's region, source gateway 40 establishes a second segment or transit connection to destination gateway 41. When source gateway 40 wants to communicate with destination gateway 41, source gateway 40 first establishes a transit signaling connection (not shown) to destination gateway 41. Source gateway 40 determines where terminating CU 31 is located by using, for example, standard GSM location methods involving HLR/VLR queries. "HLR" represents home location register, while "VLR" represents visitor location register.

The transit connection includes a transit signaling connection (not shown) and a transit mission traffic connection. As shown in FIG. 1, these connections can pass through satellites 20 and 21 and include mission traffic segments 52, 53 and 54. Satellite 20 is used to connect segment 52 with segment 53 to establish part of the transit mission traffic connection. Satellite 21 is also a switchable node in satellite communication system 100. Satellite 21 is used to connect segment 53 with segment 54 to establish the second part of the transit mission traffic connection.

Gateway 40 is a switchable node in satellite communication system 100. Gateway 40 can connect segment 51 with segment 52. This connects the local mission traffic connection with the transit mission traffic connection. Signaling connections between satellite 20 and gateway 40 are not shown in FIG. 1.

After the transit connection is established, a third segment is established. Here, destination gateway 41 establishes a local mission traffic connection between itself and terminating CU 31. When destination gateway 41 wants to communicate with terminating CU 31, destination gateway 41 first establishes a local signaling connection (not shown) to terminating CU 31. The local mission traffic connection can pass through satellite 21 and can include local mission traffic segments 55 and 56 as shown in FIG. 1. Satellite 21 is used to connect segment 55 with segment 56 to establish a local mission traffic connection. Satellite 21 also provides a local signaling connection (not shown).

Gateway 41 is also a switchable node in satellite communication system 100. Gateway 41 can connect segment 54 with segment 55. This connects the transit mission traffic connection with the second local mission traffic connection. Signaling connections between satellite 21 and gateway 41 are not shown in FIG. 1. Signaling connections between satellite 21 and terminating CU 31 are also not shown in FIG. 1.

After the two local connections and transit connection are established, a complete mission traffic connection can occur. This can occur if gateway 40 connects segment 51 to segment 52 and gateway 41 connects segment 54 to segment 55. Communication units 30 and 31 can then communicate with each other over the mission traffic connection, which includes segments 50, 51, 52, 53, 54, 55 and 56. In this case, satellite 20, satellite 21, source gateway 40 and/or destination gateway 41 can be used to detect and prevent fraudulent use of system resources.

A gateway-removal process can be performed in which one or more gateways are removed from the mission traffic path. If source gateway 40 is removed, then a complete mission traffic connection could include segments 50, 53, 54, 55 and 56. This could occur if satellite 20 is used to connect segment 50 to segment 53. If source gateway 40 and destination gateway 41 are removed, then a complete mission traffic connection could include segments 50, 53 and 56. This could occur if satellite 20 is used to connect segment 50 to segment 53, and satellite 21 is used to connect segment 53 to segment 56.

In a preferred embodiment, the gateway-removal process is used to remove all gateways. The gateway-removal process, whether it is executed by the gateways or the satellites, eliminates the need for the mission traffic (voice/data) to pass through source gateway 40 and destination gateway 41. For example, voice/data is transmitted between communication units 30 and 31 over mission traffic segments 50, 53 and 56, which bypasses mission traffic segments 51, 52, 54 and 55. Satellite 21 is used to prevent segment 53 from being connected to segment 56 until operations described below are performed to ensure that unauthorized use of system resources does not occur.

Figure 2:
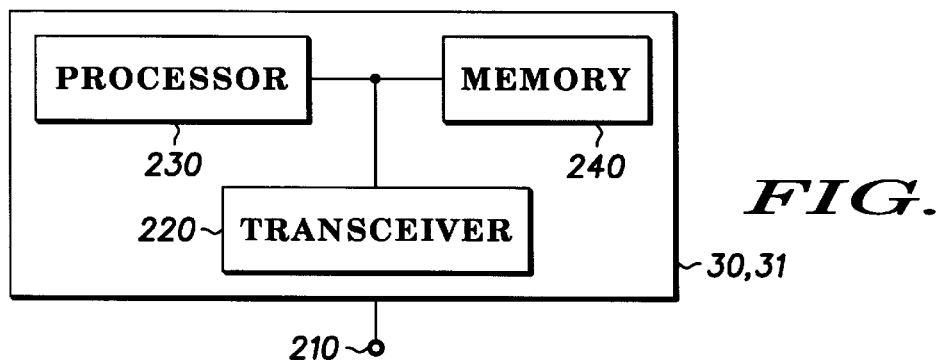
FIG. 2 shows a simplified block diagram of a communication satellite for use in accordance with a preferred embodiment of the present invention.

FIG. 2 shows a simplified block diagram of a communication unit in accordance with a preferred embodiment of the present invention. Communication units 30, 31 each comprise at least the following components: antenna 210, transceiver 220, processor 230 and memory 240. There can be other components of communication units 30, 31 that are not shown which are necessary for operating a communication unit but are not important to the present invention.

Transceiver 220 in the communication unit desirably comprises an acquisition channel transceiver portion, a broadcast channel receiver portion and a traffic channel transceiver portion. The acquisition channel transceiver portion communicates on one of several acquisition channels as determined by communication satellite and is primarily used during access protocols when a subscriber desires access to satellite communication system. The traffic channel transceiver portion communicates with a communication satellite. Those of ordinary skill in the art will understand that the acquisition channel transceiver portion, the broadcast channel receiver portion and the traffic channel transceiver portion can be contained in one unit capable of all three functions.

Processor 230 is coupled to transceiver 220 and to memory 240. The processor controls the communication unit operations. Memory 240 stores data that serve as instructions to the processor and that, when executed by the processor, cause the communication unit to carry out procedures which are discussed below. In addition, memory 240 includes variables, tables, and databases that are manipulated during the operation of satellite.

Fraudulent users could modify the data stored in memory 240 to cause a communication unit to operate in a manner different from the one intended by the original manufacturer. Instructions could be changed to alter the performance of a communication unit. Likewise, fraudulent users could modify processor 230 to cause a communication unit to operate in a manner different from the one intended by the original manufacturer.

Figure 3:
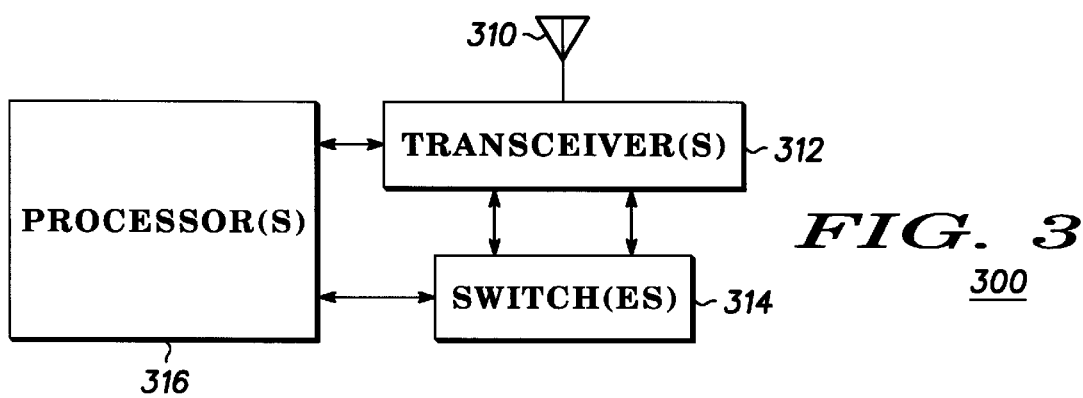
FIG. 3 shows a simplified block diagram of a switchable node in accordance with a preferred embodiment of the present invention.

FIG. 3 shows a simplified block diagram of a switchable node in accordance with a preferred embodiment of the present invention. Switchable node 300 can represent satellites 20 and 21, and/or gateways 40 and 41 according to a preferred embodiment of the present invention. Switchable nodes 300 can be terrestrial-based switches and/or space-based switches. Switchable node 300 comprises at least the following components: antenna 310, transceiver 312, switch 314, and processor 316. There can be other components of switchable node 300 that are not shown which are necessary for operating a switchable node but are not important to the present invention. Moreover, more than one unit of the components can be provided in switchable node 300, such as multiple antennas 310, multiple transceivers 312, multiple switches 314 and more than one processor 316, for example.

Antenna 310 of switchable node 300 is coupled to transceiver 312, while transceiver 312, switch 314, and processor 316 are inter-coupled to each other. Transceiver 312 is able to transmit or receive control traffic and mission traffic. Processor 316 controls the operation of switchable node 300 and the other components of switchable node 300. Processor 316 can comprise timers and memory devices. Memory devices, for example, store part of the software executable version of procedures described below and other software programs. In a preferred embodiment, one function provided by switch 314 is control of the mission traffic path.

Each gateway 40, 41 includes at least one transceiver which directly communicates with at least one of the communication satellites 20,21. Gateways also include transceivers to interface with the public switched terminal network (PSTN). Gateways can perform call processing functions in conjunction with the communication satellites. Gateways can exclusively handle call processing and allocation of call handling capacity within the satellite communication system. Other terrestrial-based communications systems can access the satellite communication system through gateways.

The gateway's processor performs some operations which control and manage user access, message reception and transmission, channel set-up, radio tuning, frequency and time slot assignment, and other communication and control functions not managed or provided for by other system control centers. Among other things, the gateway's processor desirably executes some procedures to control mission and monitor traffic. Monitoring is desirably done for signaling and non-signaling traffic. This can include procedures for denying access as discussed below.

Communication units and gateways can include transcoders or vocoders to transform analog audio signals into digital packets and vice-versa. Wireless communication networks often employ the use of transcoders or vocoders to analyze human speech at a source node using sophisticated modeling techniques which reflect human speech capabilities. Each transcoder can include a voice coder to compress voice call data and a voice decoder to decompress compressed call data.

Satellites 20, 21 comprise earth link transceivers, crosslink transceivers, and subscriber link transceivers. Earth link transceivers provide communication links with gateways. Crosslink transceivers support crosslinks to other nearby communication satellites. Subscriber link transceivers support links with communication units. Preferably, each satellite can simultaneously support a link for up to a thousand or more of communication units.

The satellite's processor generally controls and manages user access, message reception and transmission, channel set-up, radio tuning, frequency and time slot assignment, and other communication and control functions not managed or provided for by other system control centers. Among other things, processor 230 desirably executes procedures to control and monitor user traffic. Monitoring must be done for both signaling and non-signaling traffic. This can include procedures for denying access.

The satellite's processor performs some operations which control and manage user access, message reception and transmission, channel set-up, radio tuning, frequency and time slot assignment, and other communication and control functions not managed or provided for by other system control centers. Among other things, the satellite's processor desirably executes some procedures to control signaling and mission traffic. Monitoring is desirably done for signaling and non-signaling traffic. This can include procedures for denying access as discussed below, for doing hand-offs to other satellites and performing other associated functions.

Figure 4:
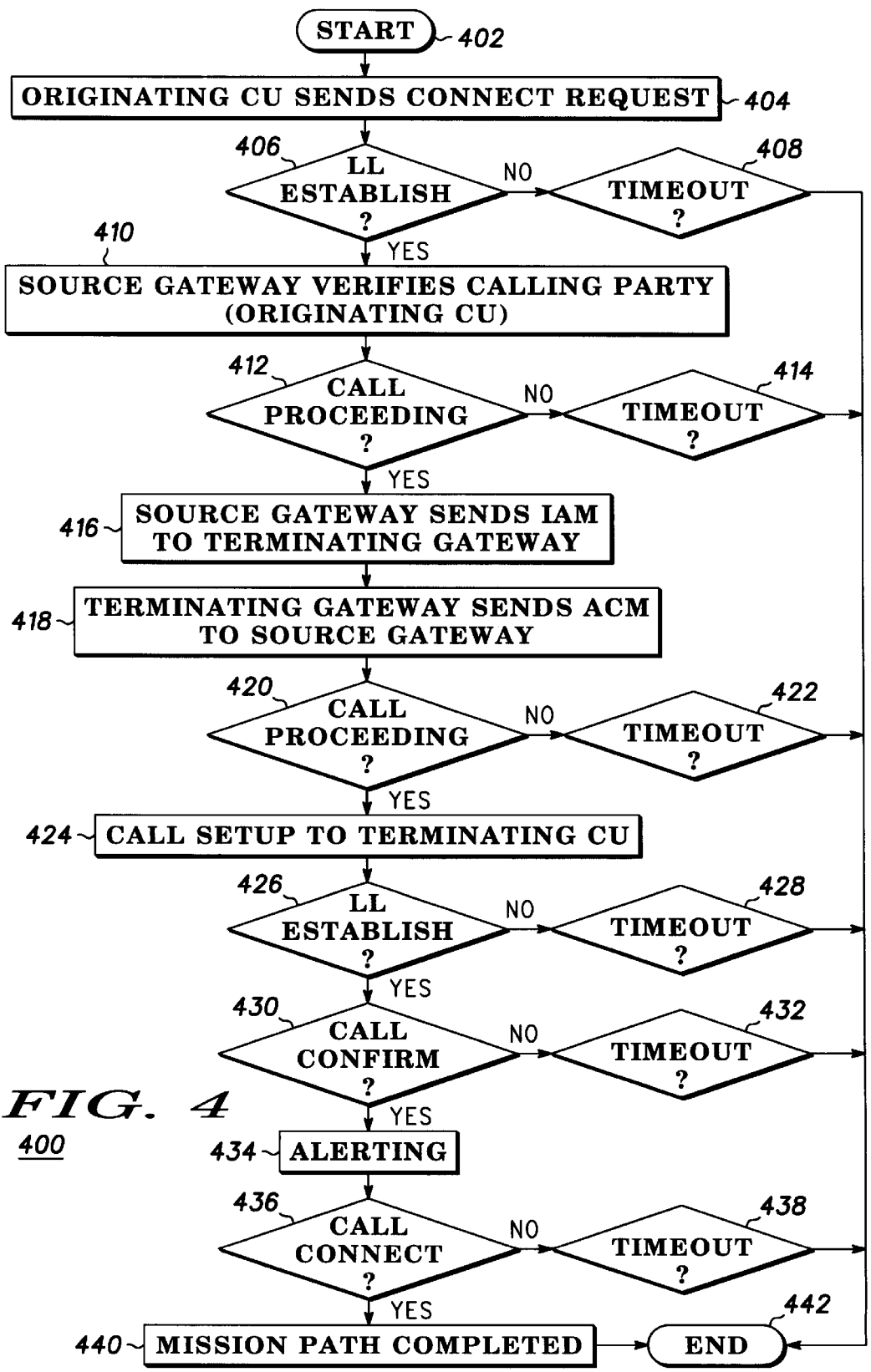
FIG. 4 shows a flow chart for performing a call setup procedure which prevents fraudulent users from acquiring services from a satellite communication system in accordance with a preferred embodiment of the present invention.

FIG. 4 shows a flow chart for performing a call setup procedure which prevents fraudulent users from acquiring services from a satellite communication system in accordance with a preferred embodiment of the present invention.

Procedure 400 starts in step 402. This could be the result of a user causing his/her communication unit to go off-hook. This could occur when the handset is picked up from the cradle or the flip mechanism of a flip-phone is "flipped open". In step 404, a connect request is sent by an originating communication unit (calling party). This could result from a user inputting the number of a called party and pushing the send key on the communication unit.

The communication unit begins the calling process by sending a connection request to the satellite currently serving it. The connection request is a SETUP message. This SETUP message can be processed by one or more nodes in the system. In a preferred embodiment of the present invention, the SETUP message is processed by the source gateway for the calling party. When the source gateway receives the SETUP message, it examines the contents of the SETUP message. The source gateway determines if it can provide the services requested in the SETUP message.

In the example shown in FIG. 1, the satellite that is currently serving communication unit 30 is satellite 20. The SETUP message can include information about the communication unit and the requested call. For example, this can include but is not limited to include some of the following items: a number identifying the called party, a location of the calling communication unit, a home gateway identification and a priority of the call. The communication unit must now essentially wait for the system to perform a number of operations to connect the calling party to the called party.

In step 406, the originating communication unit first waits for the system to establish a local connection between the satellite in the constellation and the gateway which are currently serving this communication unit. When a local link is established, an "Established" message is sent by the satellite to the communication unit. This local link is between the originating communication unit and the gateway which is currently serving this communication unit. This signifies that a bi-directional voice channel is ready for use.

In step 408, a timer in the originating communication unit is running. If the satellite does not respond before the timer expires then the timer will cause the call setup procedure to end. The originating communication unit initiated the timer when it sent the connect request to the system. If the satellite (system) does not respond, this time-out timer causes the communication unit to reset. The communication unit can return to a standby state or a ready state.

In step 410, the gateway determines whether or not the originating communication unit is valid. When a communication unit requests service in satellite communication systems, the system can respond by executing a home gateway access procedure. The home gateway access procedure performs one or more geolocation measurements to determine the location of the mobile communication unit.

When a subscriber is validated for service, a service provider ID (SPID) is placed in the subscriber's communication unit to identify the country of origin of the subscriber. The home gateway access procedure performs calculations to locate a subscriber and checks the calculated location against a list of approved service providers. This feature permits system providers to enforce political sovereignty. The location calculation is then used to compute which visited gateway should control the call. This selection is usually based on which gateway is closest to the subscriber, but other criteria can be used as well.

In step 412, when the communication unit has been verified as a valid user, the gateway sends a CALL PROCEEDING message back to the communication unit. The CALL PROCEEDING message is an acknowledgment to the CC SETUP message. This informs the calling party that the call is being processed. This also provides the user with some confidence that the call is progressing normally and asks the user to be patient. If the source gateway determines that it cannot supply the requested services for one reason or another, it sends a different message to the calling party. This informs the calling party that the call could not be completed at this time.

In step 414, another timer in the originating communication unit is running. When the local link is established, the communication unit initiates another timer. This timer is established to allow the system sufficient time for the gateway to verify the connect request. If the gateway does not verify the connect request and send a CALL PROCEEDING message back to the originating communication unit in the time allowed, then the communication unit resets. The call setup procedure can cause considerable delay in the network as the network approaches full capacity. This means the system timers must provide a significant amount of time before expiring. This timer allows the communication unit to recover from a problem that may have occurred with the home (source) gateway.

The source gateway determines which terminating gateway should be contacted. In step 416, the source gateway sends an IAM message to the terminating gateway. The source gateway also initiates another timer. This timer is used to disable the call setup procedure if the terminating gateway does not respond with an ACM message within an established amount of time.

In step 418, the terminating gateway sends the ACM message to the source gateway. Once the terminating gateway receives the gateway assignment in step 418, the terminating gateway decides whether to accept or reject the connection request. The call setup procedure requires that the terminating gateway signal the currently serving satellite for the terminating communication unit with information so that the terminating communication unit, the terminating gateway, and the satellite (currently serving the terminating communication unit) can communicate with each other.

In step 420, the terminating gateway determines if it can set up the call with the terminating communication unit. If the terminating gateway cannot continue with the call setup procedure, the terminating gateway responds with a REL message. This is a release message. This ends the call setup procedure.

In step 422, the time-out timer in the source gateway is running. If the terminating gateway does not respond before the timer expires then the time-out timer will cause the call setup procedure to end.

In step 424, a CALL SETUP message is sent to the terminating communication unit. This message is sent by the gateway to the terminating communication unit via the satellite currently serving the terminating communication unit.

In step 426, the satellite finishes establishing a local link with the terminating communication unit. A Local Establishment message is generated when the local connection between a satellite and a communication unit has been established. The Local Establishment message is a signal from the satellite to the communication unit indicating to the CU that the radio resources are in place for a conversation to take place between the satellite and the CU. This provides the CU with a notification that a voice path has been established through the constellation. A normal CU has special features built into the unit which prevent it from communicating during this time period. However, fraudulent users could modify their CUs to overcome these special features.

In step 428, a timer is initiated in the terminating gateway which is used to allow enough time for the local connection to be established. If the local connection is not established within the allotted time, then this timer expires and the call setup procedure ends.

In step 430, the terminating communication unit responds to the CALL SETUP message with a CALL CONFIRM message. This is an acknowledge message to the system that the terminating communication unit has been contacted. In some prior art systems, this is when a mission traffic path was established through the constellation and data exchange could take place using fraudulent communication units.

In step 432, the timer in the terminating gateway is running. If the terminating communication unit does not respond before the timer expires then this timer will cause the call setup procedure to end.

In step 434, an alerting message is sent to the terminating gateway from the terminating communication unit. In some embodiments, an alerting message can also be sent back to the originating communication unit. In some prior art systems, this is when a mission traffic path was established through the network and data exchange could take place using fraudulent communication units.

In step 436, the terminating communication unit responds to the user answering with a CC CONNECT message. This can result when the terminating communication unit goes off-hook or the user "picks up the handset" or the user "answers the call".

In step 438, another timer in the terminating gateway is running. If the terminating communication unit does not respond with a CC CONNECT message before the timer expires then this timer will cause the call setup procedure to end.

In step 440, the mission traffic path is completed through the satellite communication system. When the mission traffic path is completed, the originating communication unit and the terminating communication unit can exchange data. Both the originating communication unit and the terminating communication unit can send and receive data via at least one satellite in the satellite communication system.

In step 442, call setup procedure 400 ends. Upon completion of the call setup procedure, status information governing communication units can be sent. For example, status information could indicate the inability to service new call setup requests because the communication unit is still busy with an on-going call.

Query tasks 408, 414, 422, 428, 432, and 438 perform monitoring functions. These tasks look for timer expirations. If a timer expiration is processed by any one of the query tasks, then the call setup procedure is stopped, and the system resources allocated to the call setup procedure are released. These timers allow the system to respond to unexpected events in a reasonable amount of time. If an expiration event is not processed, then the call setup process continues. A timer expiration can occur in a communication unit, a satellite, or a gateway. The timer expiration can result from a problem in a communication unit, in a satellite or in a gateway.

In prior art systems, mission traffic paths were completed before the CC CONNECT message was processed. This allows fraudulent users to use system resources until the last timer expires.

Figure 5:
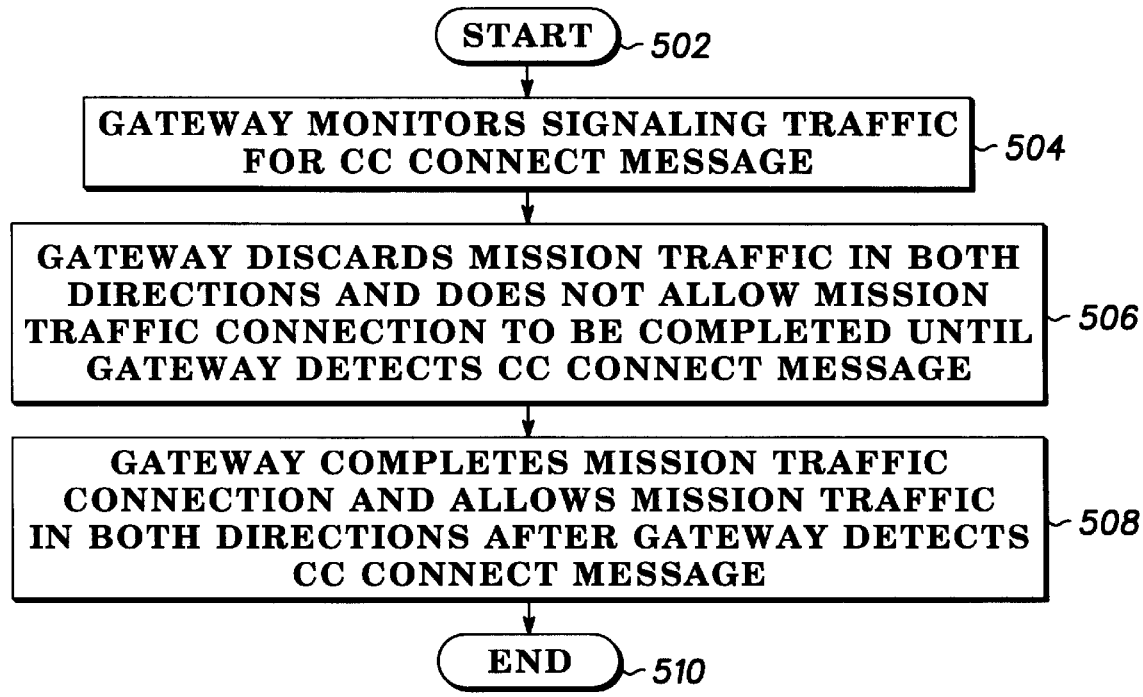
FIG. 5 shows a flow chart for using a gateway to prevent fraudulent users from acquiring services from a satellite communication system in accordance with a preferred embodiment of the present invention.

FIG. 5 shows a flow chart for using a gateway to prevent fraudulent users from acquiring services from a satellite communication system in accordance with a preferred embodiment of the present invention. Procedure 500 starts in step 502. This could be the result of a gateway receiving any number of call setup messages.

In step 504, the gateway monitors the signaling traffic through it. The gateway is capable of doing this for individual communication units. The gateway is looking for a CC CONNECT message from the terminating communication unit.

In step 506, the gateway discards any non-signaling traffic in both directions until the gateway detects a CC CONNECT message. The gateway does not allow the mission traffic path to be completed prior to the receipt of the CONNECT message.

In step 508, the gateway allows both signaling and non-signaling traffic in both directions after the gateway detects a CC CONNECT message. After detecting the receipt of the CC CONNECT message, the gateway allows the mission traffic path to be completed. Procedure 500 ends in step 510.

Figure 6:
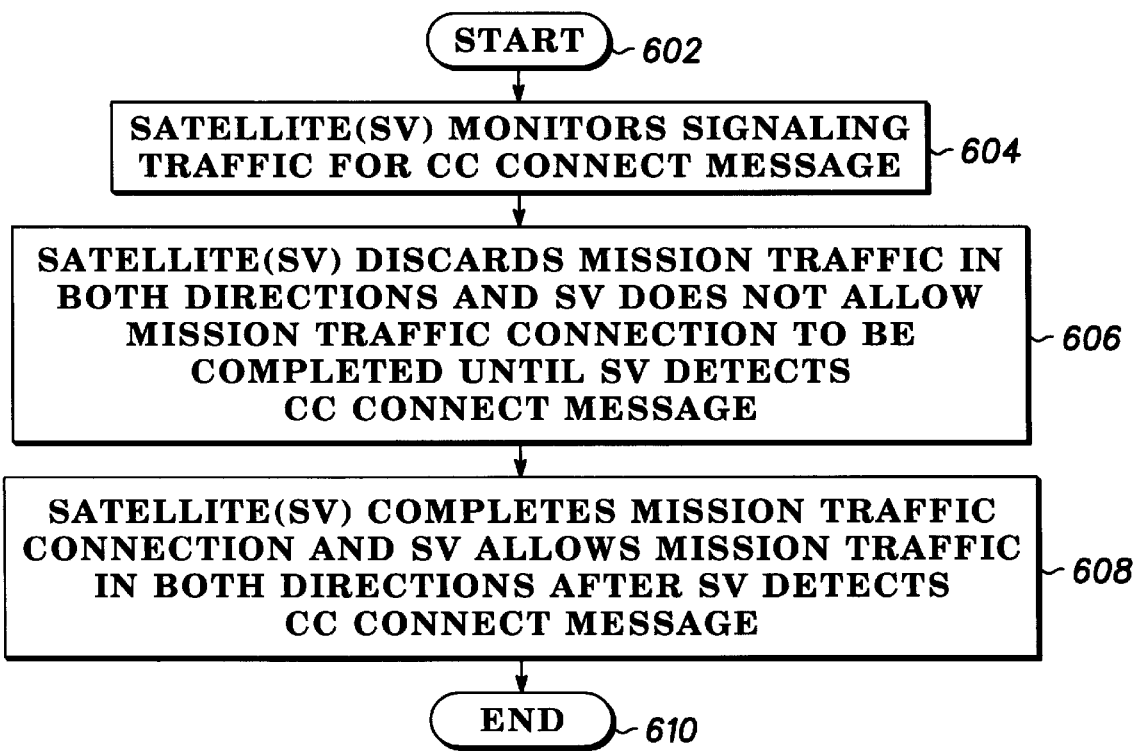
FIG. 6 shows a flow chart for using a satellite to prevent fraudulent users from acquiring services from a satellite communication system in accordance with a preferred embodiment of the present invention.

FIG. 6 shows a flow chart for using a satellite to prevent fraudulent users from acquiring services from a satellite communication system in accordance with a preferred embodiment of the present invention. Procedure 600 starts in step 602. This could be the result of a satellite detecting any one of a number of call setup messages.

In step 604, the satellite monitors the signaling traffic through it. The satellite is capable of doing this for individual communication units. The satellite is looking for a CC CONNECT message from the terminating communication unit.

In step 606, the satellite discards any non-signaling traffic in both directions until the satellite detects a CC CONNECT message. The satellite does not allow the mission traffic path to be completed prior to the receipt of the CC CONNECT message.

In step 608, the satellite allows both signaling and non-signaling traffic in both directions after the satellite detects a CC CONNECT message. After detecting the receipt of the CC CONNECT message, the satellite allows the mission traffic path to be completed. Procedure 600 ends in step 610.

Figure 7:
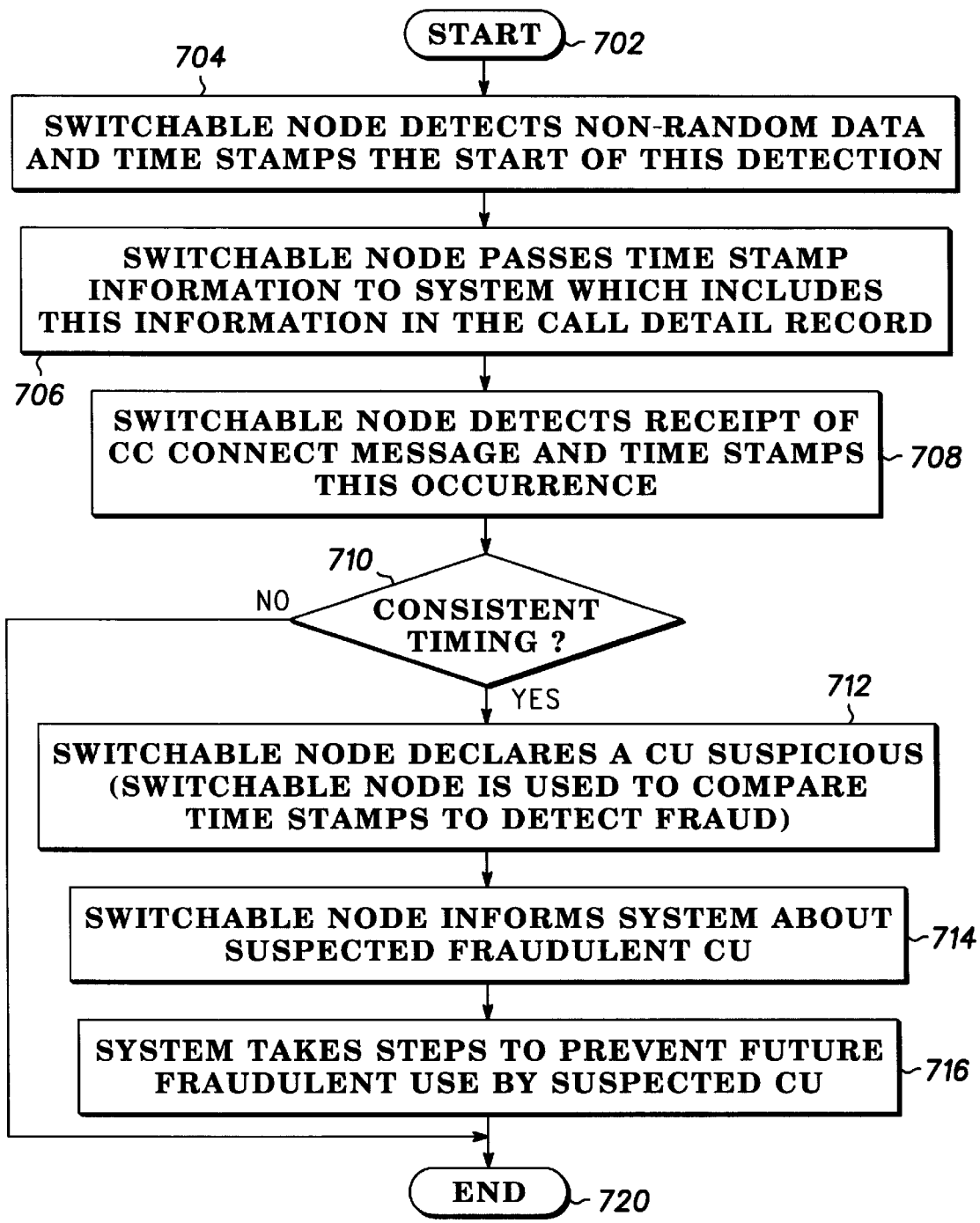
FIG. 7 shows a flow chart for a fraud detection procedure performed in accordance with a preferred embodiment of the present invention.

FIG. 7 shows a flow chart for a fraud detection procedure performed in accordance with a preferred embodiment of the present invention. Procedure 700 starts in step 702.

In step 704, the transcoder associated with one of the gateways detects non-random data and time stamps the start of this detection event. This non-random data is assumed to be fraudulent traffic and must be controlled and monitored.

In step 706, the transcoder passes the time stamp information to the gateway. The gateway includes this information in the Call Detail Record for future use by the system.

In step 708, the gateway also detects the receipt of the CC Connect message and time stamps the occurrence of this event. The gateway can detect the occurrence of the connect message or this can be done by another system resource such as one of the satellites.

In step 710, a consistency check is performed using the time stamps for the occurrence of the two events. If the time difference between the two events is consistent with a threshold established for the system, then procedure 700 branches to step 720 and ends. This is an indication of normal operation.

If the time difference between the two events is not consistent with the threshold established for the system, then procedure 700 branches to step 712. This is an indication of abnormal operation.

In step 712, the gateway declares that this communication unit (CU) is suspicious.

In step 714, the gateway informs the system about the suspected fraudulent CU.

In step 716, the system takes steps to prevent future fraudulent use by the suspected CU. The system could prevent the suspected CU from accessing the system until the system has resolved the problem. Procedure 700 ends in step 720.

Gateways can perform as intercepting nodes where a call between an originating communication unit and a terminating unit is monitored or controlled in some way. In this case, steps must be taken to allocate the network resources necessary to perform the interception. To accomplish this, the call path between the originating communication unit and the terminating communication unit must pass through the intercepting node. Any control or monitoring should be invisible to the normal system users. Usually, call interception is performed to monitor and control fraudulent users.

The advantage of the present invention is that fraudulent users are detected and prevented from using resources in an existing satellite communication system. Various resources in the system can be used to work independently to accomplish the detection and prevention tasks and/or to work together to accomplish the detection and prevention tasks.

An important feature of the method and apparatus of the present invention is that the system processing capability can be protected from unauthorized user demands. This allows improved system economics. Cost benefits can be accrued by the system using the method and apparatus of the present invention.

The present invention has been described above with reference to a preferred embodiment. However, those skilled in the art will recognize that changes and modifications can be made in this embodiment without departing from the scope of the present invention. For example, while a preferred embodiment has been described in terms of using a specific call setup procedure, other procedures can be envisioned which use different numbers of steps or different step ordering. Accordingly, these and other changes and modifications which are obvious to those skilled in the art are intended to be included within the scope of the present invention.

What is claimed is:

1. A method for preventing fraudulent use of resources in a satellite communication system, said satellite communication system comprising a plurality of satellites coupled together by a plurality of crosslinks and a plurality of gateways coupled to said plurality of satellites, wherein said plurality of gateways and said plurality of satellites comprise a plurality of switchable nodes, said method comprising the steps of:

establishing a signaling traffic connection between an originating communication unit and a terminating communication unit using at least one of said plurality of satellites;

using a switchable node for restricting access to said resources by prohibiting a mission traffic connection from being established between said originating communication unit and said terminating communication unit until said terminating communication unit sends an acceptance message;

establishing a segment between said originating communication unit and a satellite of said plurality of satellites;

establishing another segment between said satellite and said terminating communication unit;

operating said satellite as said switchable node; and connecting said segments as said mission traffic connection using said satellite when said satellite receivers said acceptance message.

2. A method as claimed in claim 1, wherein said method further comprises the steps of:

establishing a first part of said mission traffic connection, said first part comprising a first segment between said originating communication unit and a satellite of said plurality of satellites and a second segment between said satellite and a gateway of said plurality of gateways;

establishing a second part of said mission traffic connection, said second part comprising a third segment between said gateway and said satellite and a fourth segment between said satellite and said terminating communication unit;

operating said gateway as said switchable node; and connecting said first part to said second part using said gateway when said gateway receives said acceptance message.

3. A method as claimed in claim 2, wherein said method further comprises the steps of:

operating said satellite as another switchable node; and connecting said first segment to said fourth segment using said satellite when said satellite receives said acceptance message.

4. A method as claimed in claim 1, wherein said method further comprises the steps of:

establishing a first part of said mission traffic connection, said first part comprising a first segment between said originating communication unit and a satellite of said plurality of satellites and a second segment between said satellite and a gateway of said plurality of gateways;

establishing a second part of said mission traffic connection, said second part comprising a third segment between said gateway and said satellite, a fourth segment between said satellite and a second satellite of said plurality of satellites, and a fifth segment between said second satellite and said terminating communication unit;

operating said gateway as said switchable node; and connecting said first part to said second part using said gateway when said gateway receives said acceptance message.

5. The method as claimed in claim 4, wherein said method further comprises the steps of:

determining, by said satellite, when said acceptance message is received from said terminating communication unit; and completing said mission traffic connection between said originating communication unit and said terminating communication unit, wherein said satellite operates as another switchable node and connects said first segment to said fourth segment.

6. A method as claimed in claim 5, wherein said method further comprises the step of:

performing a gateway removal process when said gateway determines said acceptance message is received from said terminating communication unit.

7. A method as claimed in claim 6, wherein said performing step further comprises the step of:

determining when said acceptance message contains a connect message.

8. A method as claimed in claim 1, wherein said method further comprising the steps of:

establishing a first part of said mission traffic connection, said first part comprising a first segment between said originating communication unit and a satellite of said plurality of satellites and a second segment between said satellite and a gateway of said plurality of gateways;

establishing a second part of said mission traffic connection, said second part comprising a third segment between said gateway and said satellite, a fourth segment between said satellite and a second satellite of said plurality of satellites, and a fifth segment between said second satellite and a second gateway;

establishing a third part of said mission traffic connection, said third part comprising a sixth segment between said second gateway and said second satellite and a seventh segment between said second satellite and said terminating communication unit;

connecting said second part to said third part using said second gateway;

operating said gateway as said switchable node; and connecting said first part to said second part using said gateway to complete said mission traffic connection when said gateway receives said acceptance message.

9. A method for preventing fraudulent use of resources in a satellite communication system, said satellite communication system comprising a plurality of satellites coupled together by a plurality of crosslinks and a plurality of gateways coupled to said plurality of satellites, wherein said plurality of gateways and said plurality of satellites comprise a plurality of switchable nodes, wherein said method further comprises the steps of:

using one of said plurality of switchable nodes for restricting access to said resources by restricting a mission traffic connection between an originating communication unit and a terminating communication unit until said one of said plurality of switchable nodes determines said originating communication unit and said terminating communication unit are non-fraudulent users;

establishing a signaling traffic connection between said originating communication unit and said terminating communication unit;

creating a first time stamp based on when signaling traffic starts between said originating communication unit and said terminating communication unit on said signaling traffic connection;

establishing a mission traffic connection between said originating communication unit and said terminating communication unit;

creating a second time stamp based on when an acceptance message is sent from said terminating communication unit;

determining a time difference by comparing said first time stamp and said second time stamp;

when said time difference is greater than a predetermined period, determining that said mission traffic connection is invalid; and when said time difference is less than said predetermined period, determining that said mission traffic connection is valid.

10. A method as claimed in claim 9, wherein said method further comprises the step of:

disabling said mission traffic connection when said mission traffic connection is determined to be invalid.

11. A method as claimed in claim 9, wherein said method further comprises the step of:

monitoring said mission traffic connection when said mission traffic connection is determined to be invalid.

12. In a satellite communication system, a method of operating a gateway to prevent fraudulent use of resources in said satellite communication system, said satellite communication system comprising a plurality of satellites coupled together by a plurality of crosslinks and a plurality of gateways coupled to said plurality of satellites, said method comprising the steps of:

monitoring signaling traffic associated with a plurality of communication units;

receiving an acceptance message from a communication unit of said plurality of communication units;

when said acceptance message includes a connect message from a terminating communication unit, validating said communication unit;

when said communication unit is valid, allowing said communication unit access to said satellite communication system by establishing a mission traffic path between said terminating communication unit and an originating communication unit; and when said communication unit is not valid, preventing said communication unit from accessing said satellite communication system by not establishing a mission traffic path between said terminating communication unit and said originating communication unit.

13. In a satellite communication system, a method of operating a satellite to prevent fraudulent use of resources in said satellite communication system, said satellite communication system comprising a plurality of satellites coupled together by a plurality of crosslinks and a plurality of gateways coupled to said plurality of satellites, said method comprising the steps of:

monitoring signaling traffic associated with a plurality of communication units;

receiving an acceptance message from a communication unit of said plurality of communication units;

when said acceptance message includes a connect message from a terminating communication unit, validating said communication unit;

when said communication unit is valid, allowing said communication unit access to said satellite communication system by establishing a mission traffic path between said terminating communication unit and an originating communication unit; and when said communication unit is not valid, preventing said communication unit from accessing said satellite communication system by not establishing a mission traffic path between said terminating communication unit and said originating communication unit.

14. A switchable node adapted to prevent fraudulent use of resources in a satellite communication system, said satellite communication system comprising a plurality of space-based switchable nodes coupled together by a plurality of crosslinks and a plurality of terrestrial-based switchable nodes coupled to said plurality of space-based switchable nodes, said switchable node comprising:

at least one antenna for establishing communication links with at least one other switchable node and at least one communication unit, said communication links handling signaling traffic and mission traffic;

at least one transceiver coupled to said at least one antenna, said at least one transceiver transmitting and receiving said signaling traffic and said mission traffic;

at least one switch coupled to said at least one antenna and coupled to said at least one transceiver, said at least one switch controlling mission traffic; and at least one processor coupled to said at least one transceiver and coupled to said at least one switch, said at least one processor controlling said at least one transceiver and controlling said at least one switch, wherein said at least one processor determines when to open and close said at least one switch to control at least one mission traffic path by determining a time difference between a first time stamp and a second time stamp.

* * * * *